US008838179B2

(12) United States Patent
Epp et al.

(10) Patent No.: US 8,838,179 B2
(45) Date of Patent: Sep. 16, 2014

(54) METHOD AND APPARATUS FOR MANAGING MULTIMEDIA COMMUNICATION RECORDINGS

(75) Inventors: Anton Epp, Waterloo (CA); Lawrence Edward Kuhl, Waterloo (CA)

(73) Assignee: BlackBerry Limited, Waterloo (CA)

( * ) Notice: Subject to any disclaimer, the term of this patent is extended or adjusted under 35 U.S.C. 154(b) by 836 days.

(21) Appl. No.: 12/566,826

(22) Filed: Sep. 25, 2009

(65) Prior Publication Data

US 2011/0077047 A1    Mar. 31, 2011

(51) Int. Cl.
  H04B 1/38       (2006.01)
  H04M 1/656    (2006.01)
  H04M 1/725    (2006.01)

(52) U.S. Cl.
  CPC .......... *H04M 1/656* (2013.01); *H04M 1/72522* (2013.01)
  USPC ............. 455/566; 455/550.1; 455/556.2; 700/94

(58) Field of Classification Search
  USPC .............. 455/566, 557, 550.1, 556.2
  See application file for complete search history.

(56) References Cited

U.S. PATENT DOCUMENTS

| | | | |
|---|---|---|---|
| 6,032,053 A * | 2/2000 | Schroeder et al. | 455/553.1 |
| 6,154,875 A * | 11/2000 | Tanaka et al. | 717/107 |
| 6,298,129 B1 * | 10/2001 | Culver et al. | 379/202.01 |
| 6,427,078 B1 * | 7/2002 | Wilska et al. | 455/550.1 |
| 6,459,906 B1 * | 10/2002 | Yang | 455/556.1 |
| 6,529,742 B1 * | 3/2003 | Yang | 455/556.1 |
| 6,781,635 B1 * | 8/2004 | Takeda | 348/552 |
| 6,968,206 B1 * | 11/2005 | Whitsey-Anderson | 455/556.1 |
| 7,088,990 B1 * | 8/2006 | Isomursu et al. | 455/412.1 |
| 7,139,014 B1 * | 11/2006 | Kim et al. | 348/14.01 |
| 7,155,202 B2 * | 12/2006 | Helal | 455/404.1 |
| 7,260,383 B1 * | 8/2007 | Ngan | 455/412.1 |
| 7,310,416 B1 * | 12/2007 | Henderson | 379/142.04 |
| 7,343,178 B2 * | 3/2008 | Morishima | 455/566 |
| 7,366,529 B2 * | 4/2008 | Alanara et al. | 455/466 |
| 7,373,395 B2 * | 5/2008 | Brailean et al. | 709/219 |
| 7,386,323 B2 * | 6/2008 | Chen et al. | 455/556.1 |
| 7,409,230 B2 * | 8/2008 | Bae et al. | 455/566 |
| 7,433,672 B2 * | 10/2008 | Wood | 455/404.1 |

(Continued)

FOREIGN PATENT DOCUMENTS

WO    99/17235 A1    4/1999
WO    2008/077269 A1    7/2008

OTHER PUBLICATIONS

European Patent Application No. 09171387.5 Search Report dated Mar. 5, 2010.

(Continued)

*Primary Examiner* — Temesgh Ghebretinsae
*Assistant Examiner* — Richard Chan
(74) *Attorney, Agent, or Firm* — Steven Greenberg, Esq.; Donna Flores, Esq.; CRGO Law (57) ABSTRACT

According to embodiments described in the specification, a method and apparatus for managing multimedia communication recordings in a mobile electronic device are provided. The method comprises recording a multimedia communication and storing the recording in a memory of the mobile electronic device; detecting at least one event indicating an interruption in the communication; detecting at least one further event indicating that the communication has resumed; responsive to detecting at least one further event, inserting an audible tag in the recording, the audible tag including at least one descriptor for the at least one event.

17 Claims, 6 Drawing Sheets

(56) References Cited

U.S. PATENT DOCUMENTS

| | | | |
|---|---|---|---|
| 7,454,000 B1* | 11/2008 | Henderson | 379/142.04 |
| 7,516,183 B2* | 4/2009 | Shiigi | 709/206 |
| 7,627,349 B2* | 12/2009 | Vetelainen et al. | 455/566 |
| 2002/0091517 A1* | 7/2002 | Frank et al. | 704/231 |
| 2003/0158737 A1* | 8/2003 | Csicsatka | 704/273 |
| 2004/0055011 A1* | 3/2004 | Bae et al. | 725/62 |
| 2004/0056985 A1* | 3/2004 | Seong | 348/838 |
| 2004/0132432 A1* | 7/2004 | Moores et al. | 455/413 |
| 2004/0184585 A1 | 9/2004 | Takahashi | |
| 2007/0178934 A1* | 8/2007 | Sun | 455/550.1 |
| 2007/0281674 A1* | 12/2007 | Mock et al. | 455/417 |
| 2008/0005347 A1 | 1/2008 | Ott | |
| 2008/0027724 A1* | 1/2008 | Xie | 704/233 |
| 2008/0037514 A1* | 2/2008 | Goodman et al. | 370/352 |
| 2008/0153432 A1* | 6/2008 | Zhu et al. | 455/90.2 |
| 2008/0306735 A1* | 12/2008 | Brodhagen et al. | 704/231 |
| 2009/0258677 A1* | 10/2009 | Ellis et al. | 455/556.1 |
| 2010/0048235 A1* | 2/2010 | Dai et al. | 455/518 |
| 2011/0301728 A1* | 12/2011 | Hamilton et al. | 700/94 |

OTHER PUBLICATIONS

European Patent Application No. 09 171 387.5 Examination Report dated Jan. 25, 2012.

* cited by examiner

METHOD AND APPARATUS FOR MANAGING MULTIMEDIA COMMUNICATION RECORDINGS

FIELD

The specification relates generally to multimedia communication recordings, and specifically to a method and apparatus for managing multimedia communication recordings.

BACKGROUND

Mobile devices such as cellular phones and smart phones are widely used for various forms of communications, including, for example, voice calls and text messages. As mobile devices are developed with greater and greater computational resources, additional features are being provided to such devices, such as the ability to make and store recordings. However, the capabilities of these devices with respect to the management of such recordings remains limited.

BRIEF DESCRIPTIONS OF THE DRAWINGS

Embodiments are described with reference to the following figures, in which.

DETAILED DESCRIPTION OF THE EMBODIMENTS

According to an aspect of the specification, a method of managing multimedia communication recordings in a mobile electronic device is provided, comprising: recording a multimedia communication and storing the recording in a memory of the mobile electronic device; detecting at least one event indicating an interruption in the communication; detecting at least one further event indicating that the communication has resumed; and, responsive to detecting at least one further event, inserting an audible tag in the recording, the audible tag including at least one descriptor for the at least one event.

According to a further aspect of the specification, a mobile electronic device is provided, comprising: at least one input device; a communications interface; a memory for storing a recording of a multimedia communication; a processor interconnected with the at least one input device, the communications interface and the memory; the processor being configured to provide the multimedia communication to the memory for storage, and to detect at least one event indicating an interruption in the communication; the processor being further configured to detect at least one further event indicating that the communication has resumed; the processor being further configured, responsive to detecting at least one further event, to insert an audible tag in the recording, the audible tag including at least one descriptor for the at least one event.

According to yet another aspect of the specification, a computer readable storage medium is provided, storing computer readable programming instructions executable by a processor of a mobile electronic device for causing the mobile electronic device to implement a method comprising: recording a multimedia communication and storing the recording in a memory of the mobile electronic device; detecting at least one event indicating an interruption in the communication; detecting at least one further event indicating that the communication has resumed; and, responsive to detecting at least one further event, inserting an audible tag in the recording, the audible tag including at least one descriptor for the at least one event.

Figure 1:
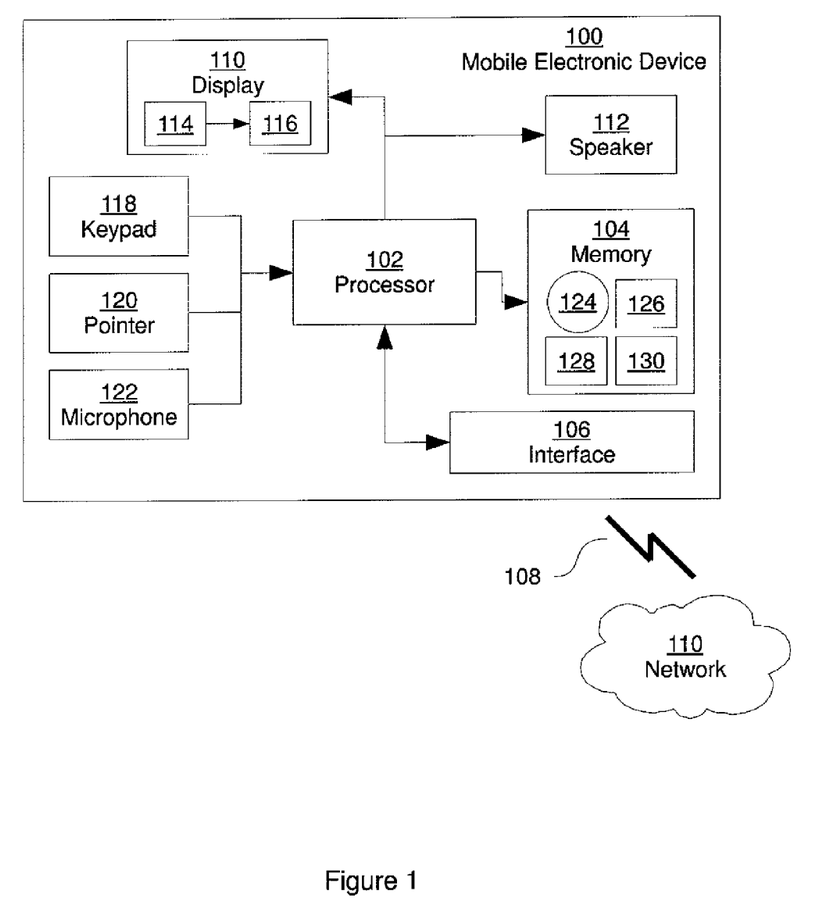
FIG. 1 depicts a schematic block diagram of a mobile electronic device, according to a non-limiting embodiment.

FIG. 1 depicts a mobile electronic device 100 for managing multimedia communication recordings. In the present embodiment, mobile electronic device 100 is based on the computing environment and functionality of a hand-held wireless communication device. It will be understood, however, that mobile electronic device 100 is not limited to a hand-held wireless communication device. As will now be apparent to those skilled in the art, a variety of mobile electronic devices can be used, such as cellular telephones, smart telephones, personal digital assistants, media players and laptop computers. Mobile electronic device 100 includes a processor 102 interconnected with a memory 104. It will now be apparent to those skilled in the art that memory 104 can be non-volatile memory (e.g. read only memory ("ROM"), Electrically Eraseable Programmable Read Only Memory ("EEPROM"), flash memory, magnetic computer storage devices, optical discs), volatile memory (e.g. Random Access Memory ("RAM")) or any suitable combination thereof.

Mobile electronic device 100 also includes a communications interface 106 interconnected with processor 102. Communications interface 106 provides wireless or wired communication capabilities, or both wireless and wired communication capabilities, to portable electronic device 100, by way of a link 108 connecting portable electronic device 100 to a network 110. In the case of wireless communication, link 108 can be a wireless link based on core mobile network infrastructure (e.g. Global System for Mobile communications ("GSM"); Code Division Multiple Access ("CDMA"); CDMA 2000; 3G; 4G). Link 108 can also be based on wireless local area network ("WLAN") infrastructures such as the Institute for Electrical and Electronic Engineers ("IEEE") 802.11 Standard (and its variants), Bluetooth or the like, or hybrids thereof.

Mobile electronic device 100 also includes one or more output devices such as a display device 110 and a speaker 112. Additional output devices are also contemplated, such as a Light Emitting Diode ("LED") indicator (not shown) and a motor for vibrational output (not shown). Other output devices will also occur to those skilled in the art. Display device 110 comprises circuitry 114 for generating a visible representation 116. It will now be apparent to those skilled in the art that display device 110 can include a flat panel display (e.g. liquid crystal display ("LCD"), plasma, organic light emitting diode ("OLED") display and the like), a cathode ray tube ("CRT"), and the like. Speaker 112, as will be appreciated by those skilled in the art, can be controlled by processor 102 to emit audible signals in the form of air pressure waves based, for example, on digital representations of sound stored in memory 104.

Mobile electronic device 100 further includes one or more input devices for receiving input, such as a keypad 118 and a pointing device (or "pointer") 120. Pointing device 120 can be, for example, a trackball. It will now be apparent that in some embodiments, either or both of keypad 118 and pointer 120 can also be provided by a touchscreen integrated with display device 110. In such embodiments, circuitry 114 of display device 110 can be controlled by processor 102 to generate a representation 116 of a keypad (i.e. a "virtual keypad"). Input can be received at the virtual keypad via the touchscreen integrated with display device 110.

As a further input device, mobile electronic device 100 can include a microphone 122. An audio stream generated by microphone 122 in response to sound captured at microphone 122 from the vicinity of mobile electronic device 100 can be provided to processor 102 and other components of mobile electronic device 100, as will be described below in greater detail. The audio stream generated by microphone 122 can be, for example, a digital representation of the sound captured by microphone 122. Additional input devices may also occur to those skilled in the art. For example, mobile electronic device 100 can include a camera (not shown) for capturing images or video. The various components of mobile electronic device 100 are interconnected, for example via a communication bus (not shown).

Mobile electronic device 100 also includes a recording application 124, which can be stored in memory 104. Recording application 124 comprises programming instructions for execution by processor 102. In a present embodiment, recording application 124 can be stored in memory 104 of mobile electronic device 100. It will be understood, however, that in other exemplary embodiments, recording application 124 can be maintained in any of a variety of computer readable storage media, including but not limited to removable diskettes, optical media such as compact discs ("CDs") and digital video discs ("DVDs"), hard drive discs, USB drives and the like. The computer readable medium storing the programming instructions of recording application 124 can also be remote to mobile electronic device 100, and the programming instructions can be transmittable to mobile electronic device 100 via interface 106, link 108 and network 110.

Upon processing recording application 124, making appropriate use of memory 104 where necessary, portable electronic device 100 is configured to manage recordings, as will be discussed in greater detail below.

It will be appreciated that mobile electronic device 100 can be generally enabled to send and receive a variety of communications, including multimedia communications such as voice calls and video conferences. For example, voice calls can be conducted to and from mobile electronic device 100 via communications interface 106, link 108 and network 110. During such voice calls, an incoming audio stream can be received at communications interface 106 and provided to processor 102. An outgoing audio stream can also be received at processor 102 from microphone 122. Processor 102 can then control speaker 112, as mentioned earlier, to render the incoming audio stream as audible output from mobile electronic device 100, while providing the outgoing audio stream to communications interface for delivery via link 108 and network 110.

Of particular note, processor 102, when executing the programming instructions of recording application 124, can also be configured to provide the incoming and outgoing audio streams to memory 104 for storage as a file or recording 126.

It will now be apparent that similar recording capabilities can be provided to processor 102 via execution of recording application 124 for other types of multimedia communications. For example, in the case of a video conference, incoming and outgoing video streams can also be stored in memory 104 as recording 126.

Figure 2:
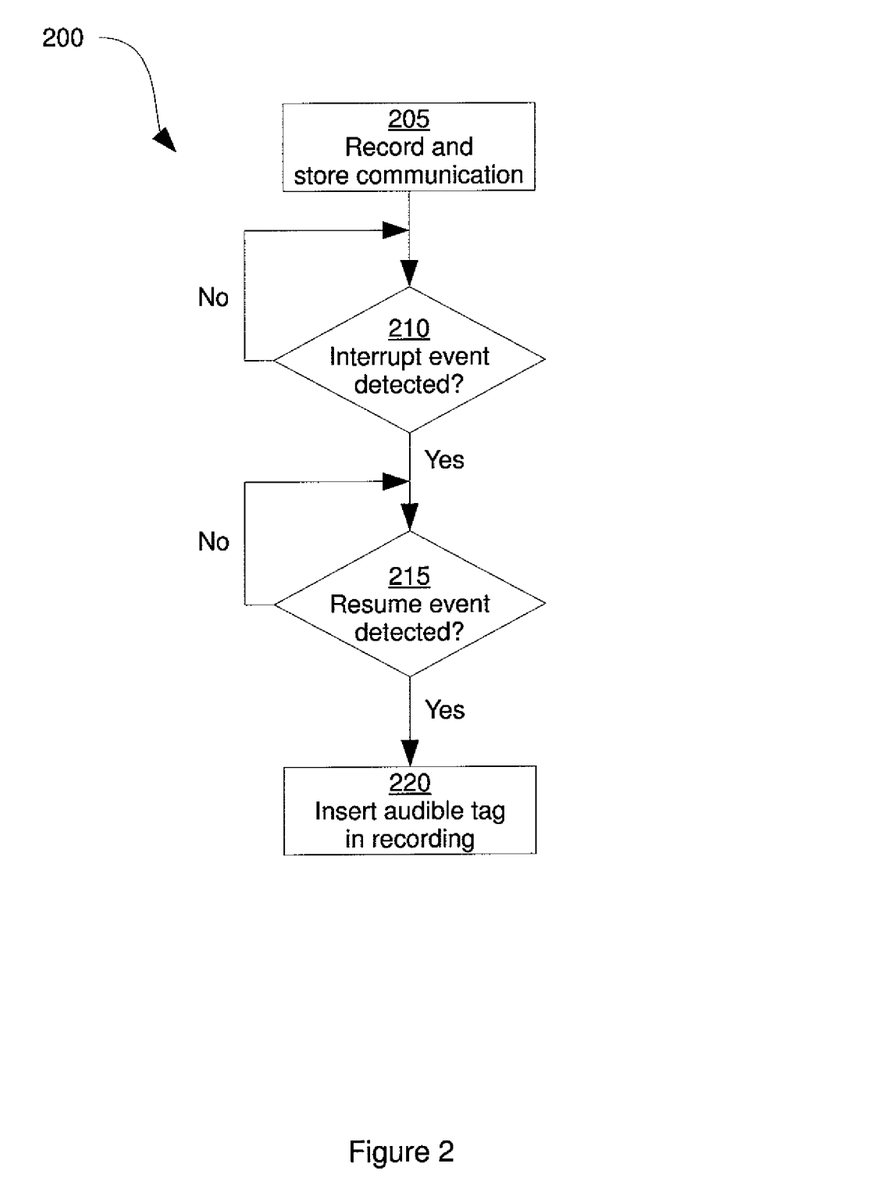
FIG. 2 depicts a flowchart of a method for managing multimedia communication recordings, according to a non-limiting embodiment.

Referring now to FIG. 2, a method 200 is depicted for managing multimedia communication recordings in a mobile electronic device 100 according to an exemplary non-limiting embodiment. In order to assist in the explanation of method 200, method 200 will be described in conjunction with its exemplary performance on mobile electronic device 100. The following discussion of method 200 will also lead to a further understanding of mobile electronic device 100 and the various components thereof. It will be appreciated, however, that mobile electronic device 100 and method 200 can be varied, and need not operate exactly as described herein in conjunction with each other.

Method 200 begins at block 205 with the recording of a multimedia communication, such as a voice call. As discussed above, processor 102 executing recording application 124 is configured to store copies of incoming and outgoing audio streams of the voice call in memory 104 as recording 126. It will be appreciated by those skilled in the art that although only one recording 126 is shown, being a single file containing both incoming and outgoing audio streams, in other embodiments (not shown), the incoming and outgoing streams can be stored as separate recordings in memory 104.

Method 200 continues at block 210. In general, processor 102 is configured to monitor the voice call or any other communication for events, and to record data concerning any detected events (the type of event, the time of occurrence and the like). Such recorded data can be stored in memory 104. At block 210, processor 102 is configured, via execution of recording application 124, to determine whether an event indicating an interruption (or, "interrupt event") in the voice call has been detected. Processor 102 can be configured to detect interrupt events that originate at mobile electronic device 100 (such, as for example, an input received at processor 102 from keypad 118 indicating that the voice call has been placed "on hold" so that mobile electronic device 100 can answer another call or attend to some other task) as well as events that originate remotely from mobile electronic device 100. For example, processor 102 can determine, at block 210, that an interrupt event has been received via communications interface 106 from network 110. Such remotely-originating events can indicate, for example, that the voice call has been placed "on hold" by another participant in the voice call.

If the determination at block 210 is negative, method 200 waits at block 210. It will be appreciated that when block 210 is being performed simultaneously with block 205, if the voice call is terminated, no further determinations will be made at block 210.

If the determination at block 210 is affirmative, method 200 proceeds to block 215, where processor 102 is configured, via execution of recording application 124, to determine whether a further event indicating that the voice call has been resumed (or, "resume event") has been detected. As with block 210, resume events detected in connection with block 215 can include events that originate both locally to and remotely from mobile electronic device 100.

If the determination at block 215 is negative, indicating that the interruption persists, method 200 waits at block 215. If, on the other hand, the determination at block 215 is affirmative, method 200 proceeds to block 220.

At block 220, processor 102 is configured, via execution of recording application 124, to insert an audible tag into recording 126 for at least one of the interrupt events determined to have been detected at block 210. It is noted that an "audible tag" as used herein is a representation (such as a digital representation) of sound. Thus, speaker 112 can be controlled by processor 102 to emit air pressure waves corresponding to the sound represented by an audible tag. Each audible tag can be placed, or inserted, in recording 126 at a position corresponding to the occurrence of the respective event the audible tag describes. Each audible tag can also include at least one event descriptor, based on data recorded by processor 102 for storage in memory 104 upon detection of interrupt and resume events. A variety of descriptors will occur to those skilled in the art. For example, an audible tag can include any combination of an audible indication of the time and date of occurrence for an event, of a duration of the event (e.g. how long the voice call remained on hold, determined by processor 102 as the time elapsed between detection of the interrupt event and the resume event), and an identification of the participant device that initiated the event. Processor 102 can be configured to determine any suitable descriptors for detected events, making use of memory 104 as necessary. For example, the duration of an "on hold" event can be determined at processor 102 based on the difference between the time at which the interrupt event was detected and the time at which the resume event was detected.

Figure 3A:
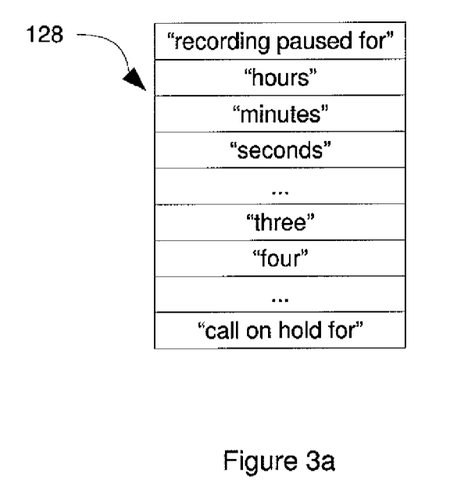
FIG. 3a depicts a schematic representation of a repository of pre-recorded audio files stored at the mobile electronic device of FIG. 1, according to a non-limiting embodiment.
Figure 3B:
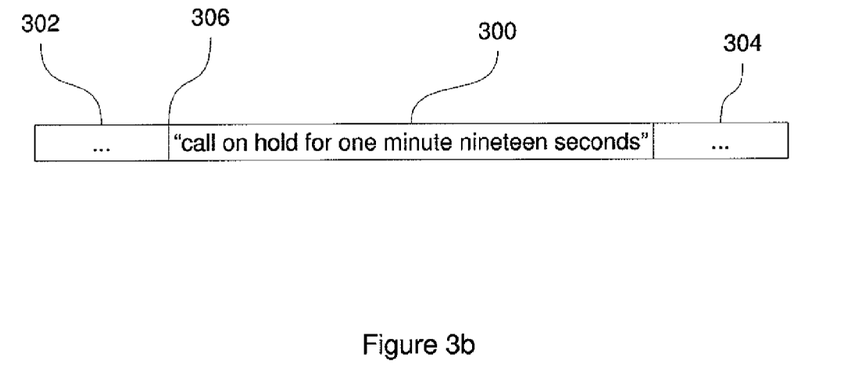
FIG. 3b depicts a schematic representation of an audible tag generated from the repository of FIG. 3a, according to a non-limiting embodiment.

Audible tags can be generated by processor 102 for insertion into recording 126 from a repository 128 of pre-recorded audio files or "sound-bites" stored in memory 104 of portable electronic device 100. It will now be apparent that the sound-bites of repository 128 can be recordings of speech recorded at an earlier time (not necessarily at mobile electronic device 100) and stored in memory 104. Referring now to FIGS. 3a and 3b, a schematic depiction of an exemplary repository 128 is provided. FIG. 3a depicts a plurality of exemplary pre-recorded sound-bites for various numbers, units of time, event descriptions and so on. FIG. 3b depicts an exemplary audible tag 300 generated by processor 102, executing recording application 124, by combining appropriate ones of the pre-recorded sound-bites based on information determined by processor 102 relating to the particular event detected at block 210 and being described by audible tag 300. In the example of FIG. 3b, audible tag 300 indicates that the voice call being recorded to recording 126 was placed on hold for one minute and nineteen seconds. Audible tag 300 thus provides an event description that can be rendered by speaker 112 under the control of processor 102 (or by any other suitable speaker) as audible air pressure waves. FIG. 3b also depicts segments 302, 304 of recording 126, showing that audible tag 300 has been inserted within recording 126 at a position corresponding to the occurrence of the event. In the example of FIG. 3b, the "on hold" event begun (i.e. was detected by processor 102 at block 210) at the point indicated at 306.

It will now be apparent that repository 128 can include any of a wide variety of pre-recorded audio files or sound bites. Sound-bites can also be provided in a variety of languages, and the language used to generate an audible tag such as audible tag 300 can be selected based on a language setting of a user profile (not shown) stored in mobile electronic device 100.

It will now be apparent to those skilled in the art that blocks 210, 215 and 220 of method 200 can be repeated for as many events as necessary during a single communication. It will also be apparent from the above description that performance of blocks 210 and 215 can be simultaneous with performance of block 205. That is, interrupt and resume events can be detected by processor 102 during the communication, while processor 102 is also recording and storing the communication in memory 104. Block 220 can be performed simultaneously with block 205, or at a later time (for example, after the communication has been terminated), as will be discussed in greater detail below. It will be appreciated that once the communication has been terminated, the performance of block 205 will also be terminated, and no further determinations will be necessary at blocks 210 and 215.

Figure 4:
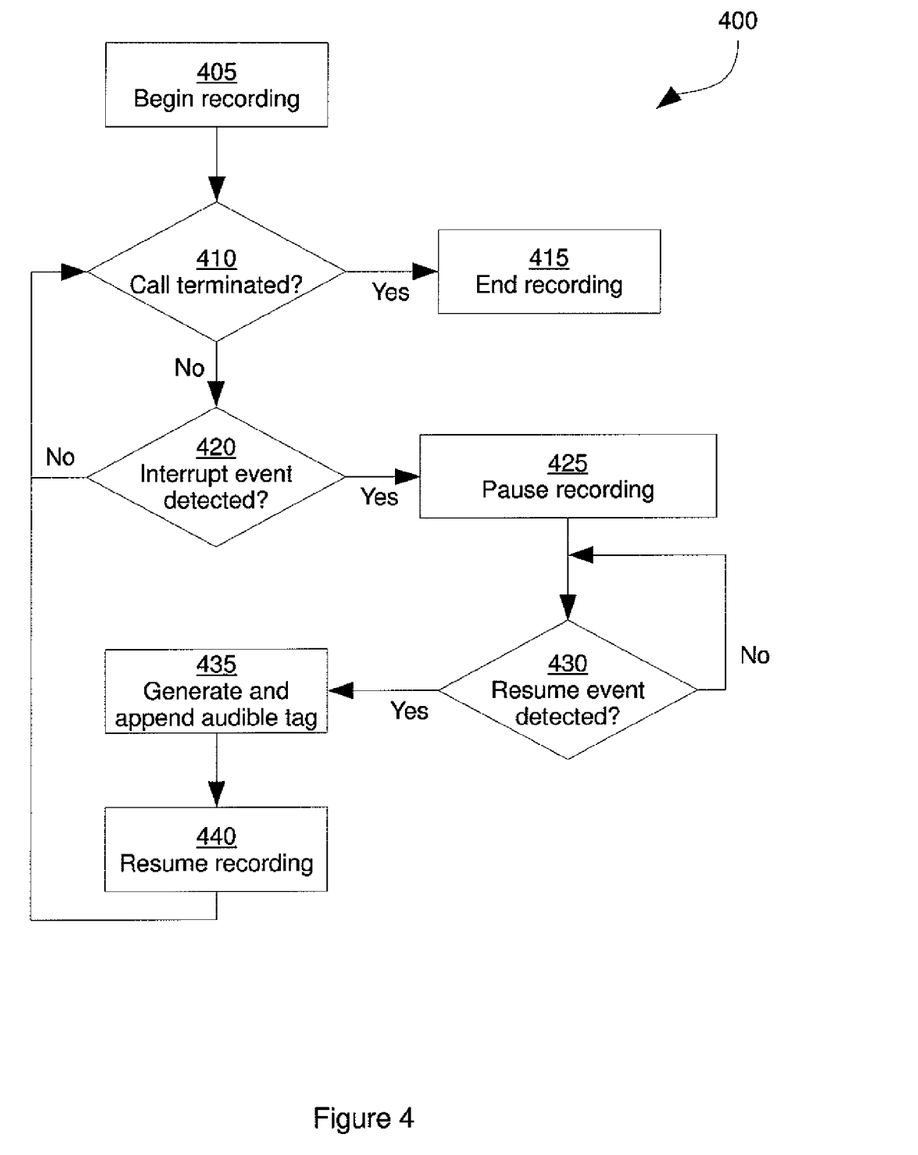
FIG. 4 depicts a flowchart of a method for managing multimedia communication recordings, according to an additional non-limiting embodiment.

Referring now to FIG. 4, a method 400 is depicted for managing multimedia communication recordings in a mobile electronic device according to a present non-limiting embodiment. In order to assist in the explanation of method 400, method 400 will be described in conjunction with its exemplary performance on mobile electronic device 100. The following discussion of method 400 will also lead to a further understanding of mobile electronic device 100 and the various components thereof. It will be appreciated, however, that mobile electronic device 100 and method 400 can be varied, and need not operate exactly as described herein in conjunction with each other.

Method 400 begins at block 405, at which processor 102 is configured, via execution of recording application 124, to begin recording a communication (such as a voice call or video conference) and storing the recording in memory 104. It will be appreciated that block 405 can be performed automatically in response to the initiation of the communication, or can be performed responsive to receiving input, for example via keypad 118. In the present exemplary performance of method 400, the communication is a voice call, and performance of block 405 results in the incoming and outgoing audio streams being provided to memory 104 for storage in recording 126.

Method 400 continues at block 410, at which processor 102 can be configured, via execution of recording application 124, to determine whether the voice call has been terminated. If the determination at block 410 is affirmative, method 400 proceeds to block 415, where the recording is ended (that is, no further data is added to recording 126 in memory 104).

If the determination at block 410 is negative, method 400 proceeds to block 420. Processor 102 is generally configured to monitor communications for events, and to record data concerning any detected events (the type of event, the time of occurrence and the like). Such recorded data can be stored in memory 104. Similarly to block 210 of method 200, at block 420 processor 102 is configured to determine whether an interrupt event has been detected. If the determination at block 420 is negative, method 400 returns to block 410. If the determination at block 420 is affirmative, on the other hand, method 400 proceeds to block 425.

At block 425, processor 102 is configured to pause the recording of the communication in response to an interrupt event detection. That is, at block 425 processor 102 is configured to temporarily cease providing the incoming and outgoing audio streams to memory 104 for storage in recording 126. As a result, no further data is added to recording 126 while the recording is paused. Having paused the recording, method 400 proceeds to block 430.

At block 430, similarly to block 215 of method 200, processor 102 is configured to determine whether a resume event has been detected, indicating that the interruption has passed. If the determination at block 430 is negative, method 400 waits at block 430. If the determination at block 430 is affirmative, method 400 proceeds to block 435.

At block 435, processor 102 is configured to generate an audible tag as described above, including at least one descriptor of the interrupt event detected at block 420. Processor 102 is also configured to insert the audible tag within recording 126. In particular, the audible tag is appended to the end of recording 126, which corresponds to the position marking the occurrence of the interrupt event (as the recording has been paused since detection of the interrupt event).

Method 400 then proceeds to block 440, where the recording is resumed. It will be appreciated that processor 102 is configured to resume the recording by once again providing the incoming and outgoing audio streams to memory 104 for storing in recording 126. Method 400 then returns to block 410, and if the voice call has not been terminated, awaits detection of further events.

It will now be apparent that while method 400 explicitly checks for termination of the communication at block 410, the recording can be ended as at block 415 if the communication is terminated at any other point during the performance of method 400. For example, if an interrupt event is detected at block 420, and processor 102 determines that the communication has been terminated before a resume event is detected at block 430, processor 102 can be configured to proceed directly to block 415. In some embodiments (not shown), processor 102 can be configured to generate and append an audible tag including at least one descriptor for the interrupt event prior to proceeding to block 415.

Figure 5:
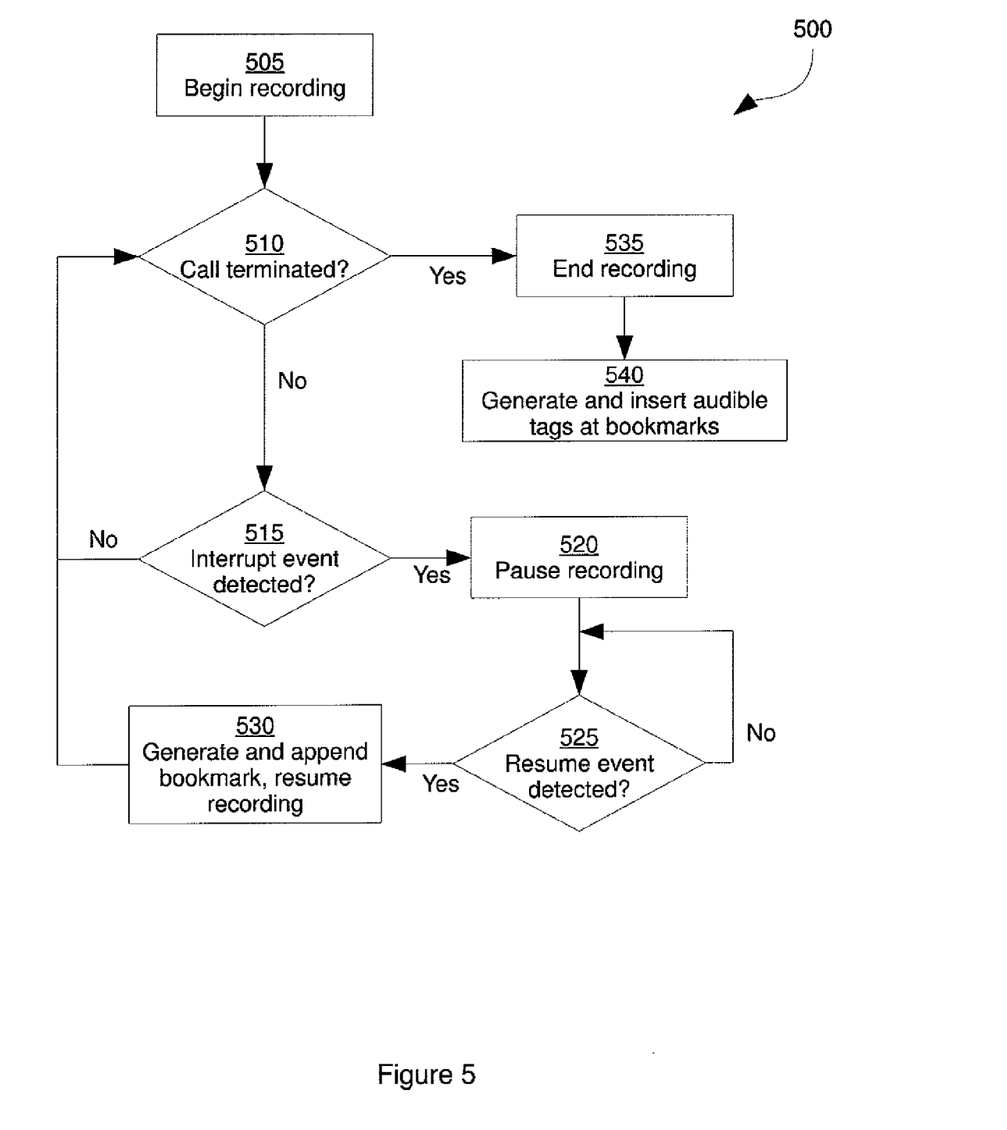
FIG. 5 depicts a flowchart of a method for managing multimedia communication recordings, according to a further non-limiting embodiment.

Referring now to FIG. 5, a method 500 is depicted for managing multimedia communication recordings in a mobile electronic device according to a further non-limiting embodiment. In order to assist in the explanation of method 500, method 500 will be described in conjunction with its exemplary performance on mobile electronic device 100. The following discussion of method 500 will also lead to a further understanding of mobile electronic device 100 and the various components thereof. It will be appreciated, however, that mobile electronic device 100 and method 500 can be varied, and need not operate exactly as described herein in conjunction with each other.

Method 500 begins at block 505, at which processor 102 begins recording a multimedia communication (such as a voice call or video conference). Method 500 then proceeds to block 510, at which a determination is made as to whether the communication has been terminated. If the determination is negative, method 500 proceeds to block 515.

At block 515, processor 102 can be configured to detect an interrupt event, as discussed above in connection with methods 200 and 400. If the determination at block 515 is negative (i.e. if no interrupt event has been detected) then method 500 returns to block 510. If the determination at block 515 is affirmative, method 500 proceeds to block 520.

At block 520, processor 102 can be configured to pause the recording, followed by performance of block 525. At block 525, processor 102 can be configured to detect a further event indicating that the communication has been resumed (i.e. a resume event), as discussed above in connection with methods 200 and 400. If the determination at block 525 is negative, method 500 waits at block 525. If the determination at block 525 is affirmative, method 500 proceeds to block 530.

At block 530, processor 102 is configured, via execution of recording application 124, to generate a bookmark and append the bookmark to recording 126. Processor 102 is also configured to then resume the recording of the communication. A "bookmark" as used herein is intended to encompass a variety of data that cannot be rendered into audible air pressure waves by a speaker such as speaker 112 under the control of processor 102. For example, a bookmark can be text or numerical data including at least one descriptor of the interrupt event detected at block 515. It will now be apparent that the generation of a bookmark at block 530 does not require a repository such as repository 128. An exemplary bookmark can include an indication of the time at which the interrupt event was detected, an identifier indicating the type of interrupt event detected, and an indication of the time at which the resume event was detected.

Following the appending of the bookmark to recording 126 at block 530, method 500 returns to block 510. If the communication has not been terminated, additional events can then be detected as described above.

If the determination at block 510 is affirmative, method 500 proceeds to block 535, at which processor 102 can be configured to terminate the recording begun at block 505. Method 500 then proceeds to block 540. At block 540, processor 102 can be configured to traverse recording 126 to determine the locations of any bookmarks in recording 126. For each bookmark, processor 102 can be configured to generate an audible tag, as described earlier, based on the information contained within the respective bookmark, and insert the audible tag at the position of the bookmark. The bookmark can then be deleted from recording 126, though it will be appreciated that this is not a necessity.

Figure 6:
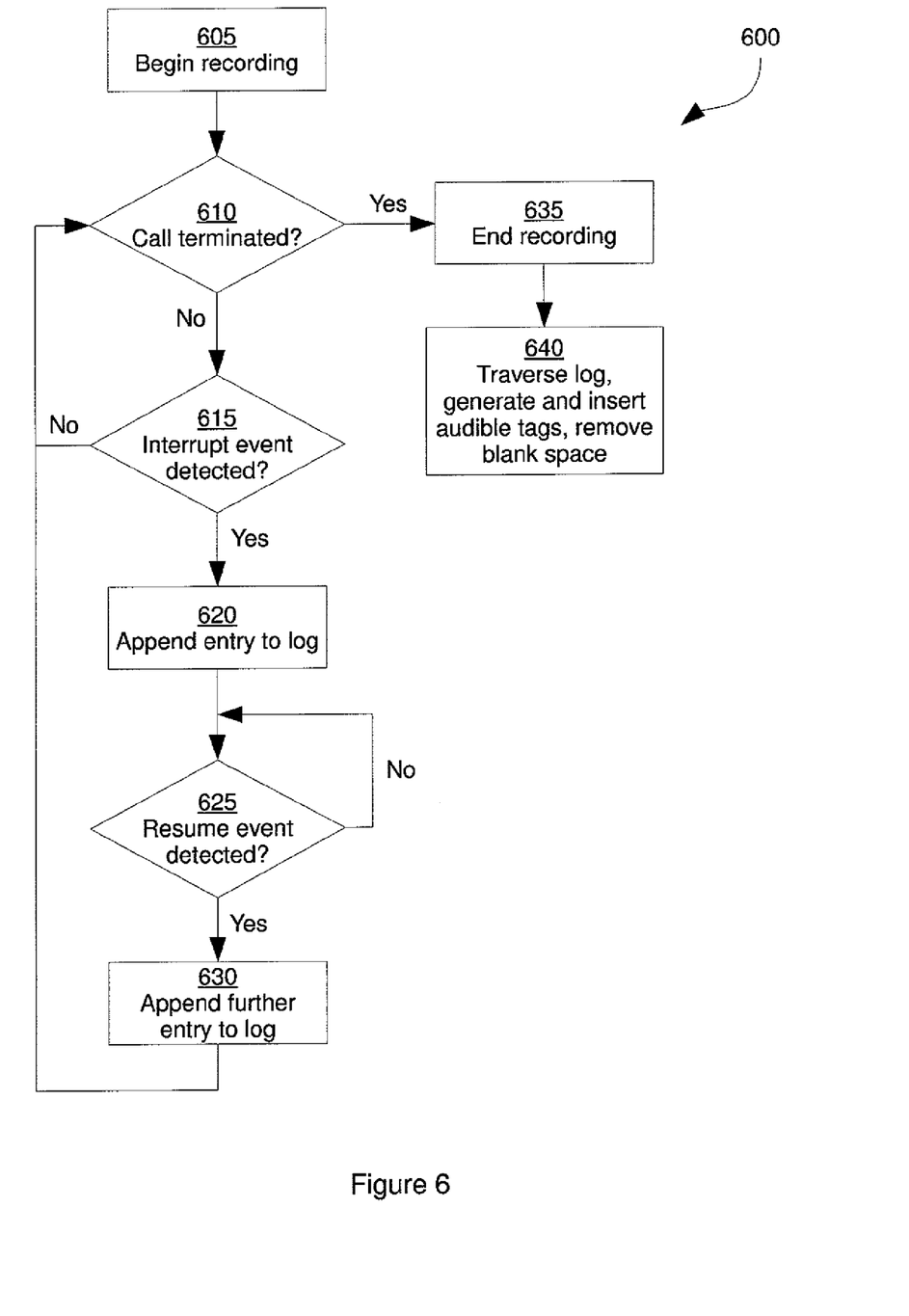
FIG. 6 depicts a flowchart of a method for managing multimedia communication recordings, according to a still further non-limiting embodiment.

Referring now to FIG. 6, a method 600 is depicted for managing multimedia communication recordings in a mobile electronic device according to a further non-limiting embodiment. In order to assist in the explanation of method 600, method 600 will be described in conjunction with its exemplary performance on mobile electronic device 100. The following discussion of method 600 will also lead to a further understanding of mobile electronic device 100 and the various components thereof. It will be appreciated, however, that mobile electronic device 100 and method 600 can be varied, and need not operate exactly as described herein in conjunction with each other.

Method 600 begins at block 605, at which processor 102 begins recording a multimedia communication (such as a voice call or video conference). Method 600 then proceeds to block 610, at which a determination is made as to whether the communication has been terminated. If the determination is negative, method 600 proceeds to block 615.

At block 615, processor 102 can be configured to detect an interrupt event, as discussed above in connection with methods 200, 400 and 500. If the determination at block 615 is negative (i.e. if no interrupt event has been detected) then method 600 returns to block 610. If the determination at block 615 is affirmative, method 600 proceeds to block 620.

At block 620, processor 102 can be configured to add or append an entry to a log. Returning briefly to FIG. 1, a log 130 can be stored in memory 104. Referring again to FIG. 6, the entry appended to log 130 by processor 102 at block 620 can include information describing the interrupt event detected at block 615 (for example, an indication of the time of occurrence and type of the event).

Method 600 then proceeds to block 625. At block 625, processor 102 can be configured to detect a further event indicating that the communication has been resumed (i.e. a resume event), as discussed above in connection with methods 200, 400 and 500. If the determination at block 625 is negative, method 600 waits at block 625. If the determination at block 625 is affirmative, method 600 proceeds to block 630.

At block 630, processor 102 can be configured, via execution of recording application 124, to append a further entry to log 130. The further entry can include, for example, an indication of the time at which the resume event was detected or an amount of time elapsed between detection of the interrupt and resume events at blocks 615 and 625, respectively.

Method 600 then returns to block 610. If the communication has not been terminated, additional events can then be detected as described above. If, on the other hand, the determination at block 610 is affirmative (i.e. the communication has been terminated), method 600 proceeds to block 635, at which processor 102 can be configured to end the recording. Proceeding then to block 640, processor 102 can be configured to traverse log 130 and, for each entry describing an interrupt event, to generate and insert an audible tag at the corresponding location in recording 126. Processor 102 can also, at block 640, be configured to remove "blank space" between respective interrupt and resume events, thus shortening recording 126 by an amount of time substantially equivalent to the difference between the length of the interruption and the length of the audible tag.

In some embodiments (not shown), processor 102 can also be configured to clear the contents of log 130 following performance of block 640, releasing a portion of memory 104 for other uses (such as further logs for later communications, for example). In some other exemplary embodiments (not shown), block 620 can be omitted, and an entry can be appended to log 130 at block 630 which describes both the interrupt and resume events. It will now be apparent that such a log entry can contain similar information to that contained in the bookmarks of method 500.

Additionally, in some embodiments of any of methods 200, 400, 500 and 600, an introductory audible tag can also be inserted at the beginning of recording 126. The introductory audible tag can be generated in the same way as other audible tags, and can include, for example, indications of the date and time, as well as the parties participating in the communication. It will be appreciated that such data can also be included in any or all of the audible tags associated with events, as described above. The introductory audible tag can be inserted within recording 126 at the initiation of the communication (for example, at blocks 205, 405, 505, or 605), or at a later time. For example, the introductory audible tag can be inserted following the termination of the communication.

Those skilled in the art will appreciate that in some embodiments, the functionality of recording application 124 can be implemented using pre-programmed hardware or firmware elements (e.g., application specific integrated circuits (ASICs), electrically erasable programmable read-only memories (EEPROMs), etc.), or other related components.

Various advantages will now occur to those skilled in the art. For example, the use of audible tags allows for reduced usage of computational resources in mobile electronic devices. By conveying the necessary information in audible form, no additional resources are consumed than would have been in any case simply by playing back the recording (for instance, via speaker 112). In contrast, approaches which rely on textual bookmarks embedded within an audible file that must be displayed (for example, by display 110) make increased demands on computational and battery resources of the device.

Other advantages will also occur to those skilled in the art. For example, the method of FIG. 6 reduces the storage space required within memory 104 by eliminating blank space from recordings. If a recording is transmitted over network 110, this reduced storage requirement then translates into reduced pressure on network resources, as well as lower drain on battery power for mobile electronic device 100 (due to the lower amount of data to be transmitted by interface 106). Additionally, the methods of FIGS. 4 and 5 allow for such reduced use of storage space as well as further reduced computational demands. In particular, pausing the recording removes the need for post-processing of the recording to remove blank space.

Persons skilled in the art will appreciate that there are yet more alternative implementations and modifications possible for implementing the embodiments, and that the above implementations and examples are only illustrations of one or more embodiments. In some embodiments (not shown), elements of any one of methods 200, 400, 500 and 600 can be combined with elements of any other of methods 200, 400, 500 and 600. For example, method 200 can make use of bookmarks as described in connection with method 500 or log 130 as discussed in connection with method 600. Method 200 can also, in some embodiments, pause the recording (as in methods 400 and 500) upon determination that an interrupt event has been detected. The scope, therefore, is only to be limited by the claims appended hereto.

We claim:

1. A method of managing multimedia communication recordings in a mobile electronic device, comprising:
   recording a multimedia communication comprising one of a voice call and a video conference, and storing the recording in a memory of the mobile electronic device;
   detecting, at a processor of the mobile electronic device, at least one event indicating that the communication has been placed on hold;
   detecting, at the processor, at least one further event indicating that the communication has resumed; and,
   responsive to detecting the at least one further event, inserting a bookmark in the recording at a position corresponding to the occurrence of the at least one event;
   responsive to termination of the call, inserting an audible tag in the recording stored in the memory at the position of the bookmark, the audible tag including at least one descriptor for the at least one event.

2. The method of claim 1, further comprising:
   responsive to detecting the at least one event, pausing the recording;
   responsive to inserting the audible tag, resuming the recording.

3. The method of claim 1, further comprising:
   storing the recording in the memory in response to an initiation of the communication;
   responsive to determining that the communication has terminated, terminating the recording.

4. The method of claim 1, wherein the multimedia communication is a voice call and recording the voice call comprises providing incoming and outgoing audio streams of the voice call to the memory for storage.

5. The method of claim 1, wherein the at least one event is received at one of an input device of the mobile electronic device and a communications interface of the mobile electronic device.

6. The method of claim 1, wherein the at least one descriptor includes at least one of a date and time of the at least one event, a description of the event, a duration of the event and an identification of the parties participating in the multimedia communication.

7. The method of claim 3, further comprising:
   responsive to the initiation of the communication, inserting an introductory audible tag at a start of the recording, the introductory audible tag including at least one of the date and time, and an identification of the parties participating in the communication.

8. The method of claim 1, wherein inserting an audible tag comprises:

selecting at least two pre-recorded audio files from a plurality of pre-recorded audio files stored in the memory; and combining the at least two pre-recorded audio file to generate the audible tag.

9. A mobile electronic device, comprising:
at least one input device;
a communications interface;
a memory for storing a recording of a multimedia communication comprising one of a voice call and a video conference;
a processor interconnected with the at least one input device, the communications interface and the memory; the processor being configured to provide the multimedia communication to the memory for storage, and to detect at least one event indicating that the communication has been placed on hold;
the processor being further configured to detect at least one further event indicating that the communication has resumed;
the processor being further configured, responsive to detecting the at least one further event, to insert a bookmark in the recording at a position corresponding to the occurrence of the at least one event;
the processor being further configured, responsive to termination of the call, to insert an audible tag in the recording at the position of the bookmark, the audible tag including at least one descriptor for the at least one event.

10. The mobile electronic device of claim 9, the processor being further configured to pause the recording, responsive to detecting the at least one event; the processor being further configured to resume the recording responsive to inserting the audible tag.

11. The mobile electronic device of claim 9, the processor being further configured to provide the multimedia communication to the memory in response to an initiation of the communication; the processor being further configured to terminate the recording responsive to determining that the communication has terminated.

12. The mobile electronic device of claim 9, wherein the multimedia communication is a voice call and the processor is further configured to provide incoming and outgoing audio streams of the voice call to the memory for storage.

13. The mobile electronic device of claim 9, wherein the at least one event is received at one of the at least one input device and the communications interface.

14. The mobile electronic device of claim 9, wherein the at least one descriptor includes at least one of the date and time of the at least one event, a description of the event, a duration of the event and an identification of the parties participating in the communication.

15. The mobile electronic device of claim 11, the processor being further configured to insert an introductory audible tag at a start of the recording responsive to the initiation of the communication, the introductory audible tag including at least one of the date and time, and an identification of the parties participating in the communication.

16. The mobile electronic device of claim 9, the processor being configured to insert the audible tag by selecting at least two pre-recorded audio files from a plurality of pre-recorded audio files stored in the memory and combining the at least one pre-recorded audio file to generate the audible tag.

17. A non-transitory computer readable storage medium storing computer readable programming instructions executable by a processor of a mobile electronic device for causing the mobile electronic device to implement a method comprising:
recording a multimedia communication comprising one of a voice call and a video conference, and storing the recording in a memory of the mobile electronic device;
detecting, at the processor, at least one event indicating that the communication has been placed on hold;
detecting, at the processor, at least one further event indicating that the communication has resumed; and,
responsive to detecting the at least one further event, inserting a bookmark in the recording at a position corresponding to the occurrence of the at least one event;
responsive to termination of the call, inserting an audible tag in the recording stored in the memory at the position of the bookmark, the audible tag including at least one descriptor for the at least one event.

* * * * *